United States Patent [19]
Herloski

[11] Patent Number: 5,773,818
[45] Date of Patent: Jun. 30, 1998

[54] DIGITAL SCANNING SYSTEM HAVING DROP-OUT CAPABILITIES AND A COLOR DROP-OUT FILTER THEREFOR

[75] Inventor: Robert P. Herloski, Webster, N.Y.

[73] Assignee: Xerox Corporation, Stamford, Conn.

[21] Appl. No.: 829,633

[22] Filed: Mar. 31, 1997

[51] Int. Cl.$^6$ ...................................................... G01J 3/50

[52] U.S. Cl. ...................... 250/226; 250/208.1; 382/163; 358/515; 399/178

[58] Field of Search ............................... 250/226, 208.1, 250/234; 382/163, 162; 355/32; 430/42, 43, 44; 358/515, 512; 399/178

[56] References Cited

U.S. PATENT DOCUMENTS 3,775,006  11/1973  Hartman et al. ........................... 355/32

*Primary Examiner*—Que Le
*Attorney, Agent, or Firm*—Michael J. Nickerson

[57] ABSTRACT

A monochromatic scanning system includes an illumination system, a document staging system, an optical lens system, a photosensing system to convert light to electrical signals and a color drop-out filter. The illumination system illuminates an original image to be scanned in the document staging system and the optical lens system directs light reflected from the original image to be scanned onto the photosensing system. The color drop-out filter is located in an optical path between the original image to be scanned and the photosensing system such that the color drop-out filter allows a predetermined range of wavelengths to pass therethrough and a range of wavelengths associated with infrared radiation to pass therethrough. this enables the monochromatic scanning system to have drop-out capability by merely substituting the color drop-out filter without further modifications to the scanning system.

14 Claims, 3 Drawing Sheets

DIGITAL SCANNING SYSTEM HAVING DROP-OUT CAPABILITIES AND A COLOR DROP-OUT FILTER THEREFOR

FIELD OF THE PRESENT INVENTION

The present invention is directed to a monochromatic digital document scanning system that includes a color drop-out filter. More specifically, the present invention is directed to a color drop-out filter for a monochromatic digital document scanning system which passes both a predetermined range or spectrum of visible light and a predetermined range or spectrum of infrared radiation, thereby allowing the monochromatic digital scanning system to drop-out a predetermined color without adjusting the lamp's characteristics, gain, or other attributes of the digital document scanner.

BACKGROUND OF THE PRESENT INVENTION

Traditionally, in the office equipment context, to make a copy of an original document, a light lens xerographic copier in which paper originals are in fact photographed was used. In these machines, the images are focused on an area of a photoreceptor, which is subsequently developed with toner. The developed image on the photoreceptor is then transferred to a copy sheet which in turn is used to create a permanent copy of the original.

In recent years, there has been made available what is known as digital scanners. With respect to the most basic functions, a digital scanner performs some of the same functions as a light lens copier such as illumination, light focusing and deflecting through lenses, etc., except that the original image of the document to be scanned is not directly focused on a photoreceptor. Instead, with a digital scanner, the original image is typically focused onto a linear array of small photosensors. The array of sensors converts the various light and dark areas of the image to a set of electronic signals which can then be further processed by appropriate electronics into digital signals.

These digital signals can be temporarily retained in a memory and then eventually used to operate a digital printing apparatus when it is desired to print copies of the original. The digital signals may also be sent to a more permanent memory type device so as to be stored for further processing or merely as data information from which a database can be created.

FIG. 1 illustrates a conventional digital document scanning system. In this conventional digital scanning system, a light source 1 is used to illuminate a document 5 having an original image to be scanned thereon. The conventional digital scanner may also include a glass platen 3 upon which the document rests if the digital scanning system is a platen digital scanning system; however, if the digital document scanner is a constant velocity transport system (CVT), the digital document scanner would not necessarily include a glass platen 3.

To scan the original image to be scanned on the document 5, the light source (illumination system) 1 illuminates (2) the document 5 through the glass platen 3 such that the light reflected (4) from the document 5 passes through an optical lens system 7. The optical lens system 7 directs the reflected light (6) to a photoelectric system which converts the light to either electrical charges or electrical signals such as a CCD sensor (CCD) or a full width array CCD sensor (FWA). In this way, the light reflected (4) from the document 5 is converted into electronic signals forming image data which electronically represents the original image to be scanned on the document 5. Somewhere in the optical path (4), (7), and (6) there is typically, but not necessarily, an optical filter 10 that modifies the spectral content of the light reaching the photosensors.

To provide a full scanning of the document 5, either the document 5 is moved relative to the illumination system 1 and the components which receive the reflected light, or the illumination system 1 and the components receiving the reflected light are moved relative to the document 5.

Typically, digital scanners are monochromatic scanners which are designed to have a panchromatic response; i.e., the scanner responds to all document colors in some way differently than it responds to white. In other words, in a simple example, a panchromatically designed scanner would register white portions of the document as white and all other colored or grey portions of the document as various shades of grey, including black.

An ideal system spectral response is the human's eye photopic response. Thus, one measurement of a monochromatic scanner is to determine how closely it responds with respect to the ideal photopic response. If the monochromatic scanner closely matches the ideal system spectral function, the monochromatic scanner ensures that the maximum amount of visible information on a document is captured and not lost. Often the characteristics of the illumination system (1) and/or the filter (11) are adjusted to give the scanner a photopic response.

However, it is not always desirable for a digital scanner to have a panchromatic or photopic response. More specifically, when utilizing a digital scanner to process forms or to perform optical character recognition, it is often desirable that the digital scanners have the ability to "drop-out" certain colors. In this application, a form may consist of a document with areas to be filled in, such as name, address, or illness, etc., designated by some color, such as red, green, etc. In a typical example, this color is light red. Moreover, the information of interest is assumed to be filled in using a dark color, such as black or dark blue.

When the document is processed by a digital scanner with drop-out capability, the digital scanner responds to the information designation areas substantially the same as the document background or white. Thus, the digital scanner produces a result in which only the information of interest (filled in differently for each form) is distinguishable. This allows the information to then be easily compressed and/or optically recognized.

The standard process for making a digital scanner drop-out a certain color is to either add a filter of that color to the optical imaging path, or design the illumination of the digital scanner to be of that color which is desired to be dropped out. If one desires to add drop-out capability to a substantially photopic scanner (as opposed to designing a drop-out scanner to start with), conventionally, additional changes must be made other than adding just a filter to the scanner. More specifically, since the filter eliminates some of the light that previously reached the CCD sensor (the photosensing system), the digital scanner has to be adapted to the different output from the CCD sensor; i.e., the magnitude of the signal from the CCD sensor will drop-off due to the reduction in available light, thereby adversely affecting the performance of the scanner if the lost signal is not compensated for by some other system device.

For example, the digital scanner must be adapted to increase the light output or utilize some other gain adjusting means or process. If there is not enough dynamic range available after these adaptations, other changes may be required to the digital scanner in order to operate in a normal range although a drop-out filter has been added. One example of an adaptation for a digital scanner which utilizes a drop-out filter is that the manufacturer of digital scanner offers a drop-out kit which includes a different lamp with the filter. This different lamp enables the digital scanner to operate at the desired dynamic range.

In another conventional digital scanner, the digital scanner utilizes an incandescent lamp as the illumination system and a replaceable trimmer filter that is placed in the optical path between the image being scanned and the CCD sensors. The purpose of this replaceable trimmer filter is to make the digital scanner's spectral response function substantially photopic. To realize this spectral response function, the filter rejects much of the infrared light present in the system since the CCD sensor is responsive to infrared radiation.

As with the other conventional digital scanners, if a color drop-out filter was merely added to the optical path of this digital scanner, the dynamic range of the light being received by the sensor would not be enough to allow the digital scanner to operate properly. Thus, other modifications would be required to this digital scanner in order to create a properly operating drop-out scanning system.

Therefore, it is desirable to create a color drop-out filter which enables a digital scanner to perform color drop-out without requiring further adaptations to enable the scanner to properly operate. More specifically, it is desirable to have a filter which can be placed easily within the optical path of the digital scanner which provides the drop-out capability for the digital scanner without requiring adjustments to the lamp's characteristics or other gain adjusting means within the digital scanner.

SUMMARY OF THE PRESENT INVENTION

One aspect of the present invention is a digital scanning system. The digital scanning system includes an illumination system, an original (or document) staging system, an optical lens system, a photosensing system to convert light to electric signals, and a color drop-out filter. The illumination system illuminates a document in the original staging system and the optical lens system directs light reflected from this original onto the photosensing system. The color drop-out filter is located in the optical path between the original and the photosensing system. The color drop-out filter allows a predetermined range of wavelengths associated with a visible spectrum of light to pass therethrough and a range of wavelengths associated with infrared radiation to pass therethrough.

Another aspect of the present invention is a color drop-out filter for a digital scanner. This color drop-out filter includes an additive color separation filter and a neutral density filter. The additive color separation filter and the neutral density filter pass a predetermined range of wavelengths associated with a visible spectrum of light and a range of wavelengths associated with infrared radiation therethrough.

A third aspect of the present invention is a color drop-out filter for a digital scanner. This color drop-out filter includes an additive color separation filter and a neutral density filter. The additive color separation filter and the neutral density filter provide a drop-out filter that produces a system output response curve wherein an area thereunder is substantially equal to an area under a system output response curve for the digital scanner operating under normal conditions.

Further objects and advantages of the present invention will become apparent from the following description of the various features of the present invention.

BRIEF DESCRIPTION OF THE DRAWINGS

The following is a brief description used in describing the present invention, thus, are being presented for illustrative purposes only and should not be limitative of the scope of the present invention, wherein.

DETAILED DESCRIPTION OF THE DRAWINGS

Figure 1:
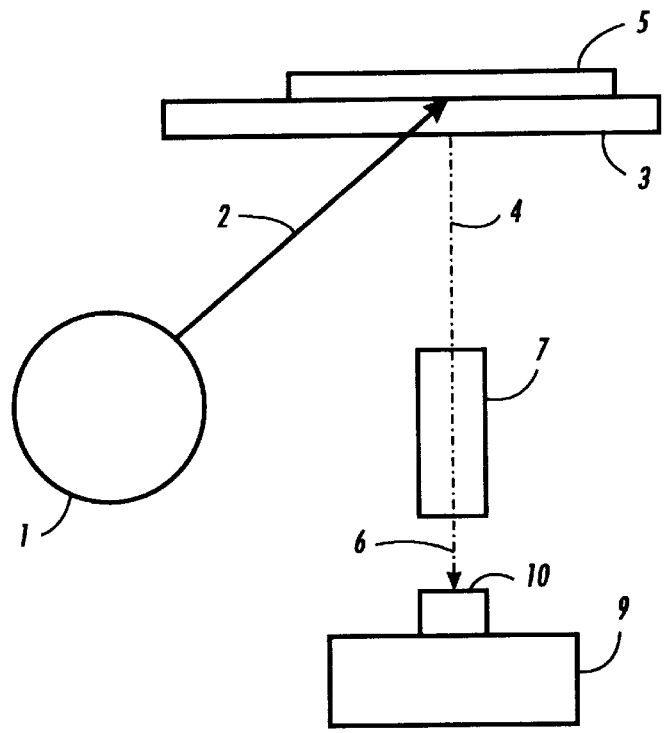
FIG. 1 illustrates a conventional digital scanning system.

For general understanding of the present invention, reference is made to the drawings. In the drawings, and in the specification, like reference numerals have been used throughout to designate identical or equivalent elements or steps.

As noted above, conventional digital scanners cannot be readily converted to have drop-out capabilities by merely adding a filter of that color to the optical imaging path. In other words, to enable the drop-out capability in a typical digital scanner, further additional changes have to be carried out with respect to the digital scanner so that the digital scanner can operate within a normal dynamic range. To understand this problem more clearly, the following description of the digital scanner output with respect to wave length of the light received by the sensor will be set forth below.

The general expression for the sensor output S of a digital scanner is:

$$S = K* \int_0^\infty H(\lambda)*\rho(\lambda)*\tau(\lambda)*f(\lambda)*R(\lambda)d\lambda$$

where $H(\lambda)$ is the document spectral irradiance due to the illuminator, $\rho(\lambda)$ is the document spectral reflectance, $\tau(\lambda)$ is the optical imaging path transmittance excluding the filter spectral transmittance $f(\lambda)$, $R(\lambda)$ is the sensor spectral responsivity, and K is a scaling constant. The quantity $\lambda$ is wavelength. Note that the integral in the above expression is merely the area under curve represented by the product of the document spectral reflectivity and the scanner system response.

Figure 2:
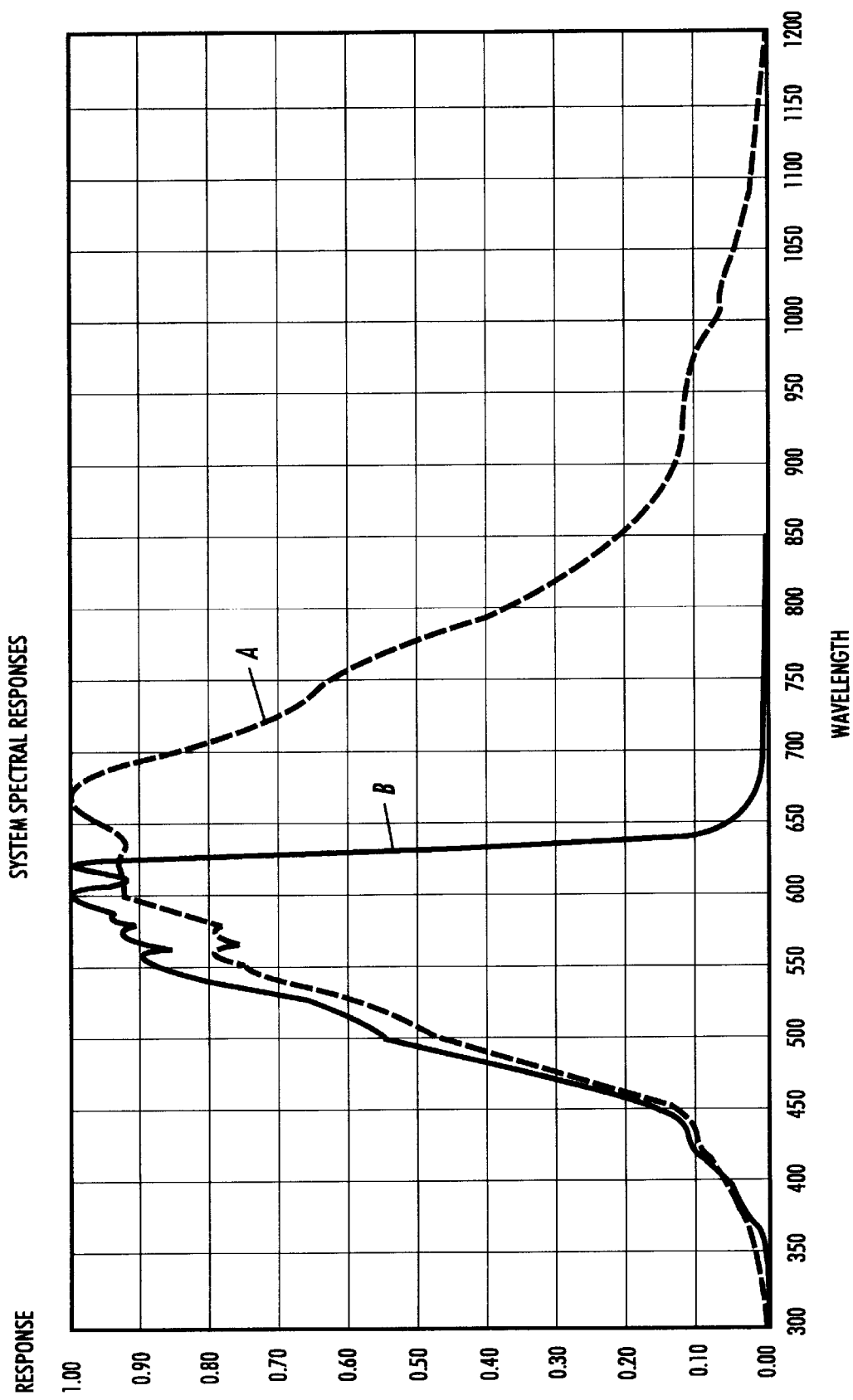
FIG. 2 is a graphical representation of system response of a typical unfiltered digital scanning system and a typical digital scanning system with a "photopic" filter added therein without adaptations.

For a typical commercially available scanner, with respect to normal operations, $f(\lambda)=f_0$ for $\lambda \leq 620$ nm and $f(\lambda) \approx 0$ for $\lambda > 620$ nm gives an approximately photopic response for the design illumination irradiance $H(\lambda)$ and sensor response $R(\lambda)$. The system spectral response is graphically shown in FIG. 2 wherein line A represents the system spectral response without a filter and line B represents the system spectral response with a "photopic" filter in the optical path. As illustrated in FIG. 2, the unfiltered output is $[S_u(\lambda)=H(\lambda)*\tau(\lambda)*R(\lambda)]$, and the filtered output is $[S_f(\lambda)=S_u(\lambda)*f_{620}(\lambda)]$.

It is evident from FIG. 2 that a large portion of light available in the system has been filtered out in order to make the system's response photopic. It is further noted that the value S is essentially the area under the curve of the system output response function (where the filter transmittance and the document reflectance are non-zero) multiplied by the document spectral reflectance. Thus, by adding an additional filter into the optical path to realize the drop-out properties, the available light is further reduced, resulting in a reduction in the area under the curve. The area under the curve is the driving factor in determining if the scanner will operate properly. If the area is too small, the signal from the sensors must be adjusted to get a correct representation of the image being scanned. This is also true if the area is too large. Therefore, it is essential that the areas under the curves for normal operations and drop-out operations be substantially equal.

In general, for a properly designed drop-out filter, the scanner signal $S_{back}$ from the background [reflectivity $\rho_{back}(\lambda)$] of the document will be substantially the same as the scanner signal $S_{drop}$ from the preprinted [information designation/drop out area, reflectivity $\rho_{drop}(l)$] parts of the document. From the equation set forth above:

$$S_{back} = K^* \int_0^\infty H(\lambda)^* \rho_{back}(\lambda)^* \tau(\lambda)^* f_{drop}(\lambda)^* R(\lambda) d\lambda$$

and $$S_{drop} = K^* \int_0^\infty H(\lambda)^* \rho_{drop}(\lambda)^* \tau(\lambda)^* f_{drop}(\lambda)^* R(\lambda) d\lambda$$

If $f_{drop}(\lambda)$ is nonzero only for those wavelengths in which $\rho_{drop}(\lambda) \approx \rho_{back}(\lambda)$, then $S_{back} \approx S_{drop}$ and $f_{drop}$ acts as a drop-out filter. As a particular example, if $f_{drop}$ is a red filter; i.e., it passes light only in the red region (wavelength 580 to 650 nm or so), red will be the drop out color.

A potential problem with this approach is that the resulting scanner output $S_{back}$ will probably be substantially different than the scanner output $S_{normal}$ from the system with a "normal" filter in place wherein the "normal" filter is a filter that may be added into the system to enable the scanner to have a substantially photopic response:

$$S_{normal} = K^* \int_0^\infty H(\lambda)^* \rho_{back}(\lambda)^* \tau(\lambda)^* f_{normal}(\lambda)^* R(\lambda) d\lambda$$

This fact is especially evident if, as in the conventional digital scanner illustrated in FIG. 1, $f_{normal}$ is non-zero over the entire visible wavelength range; i.e., 400 to 620 nm; $f_{drop}$ is required to be transmissive for only a subset of this visible range, which would be the typical way to implement a drop-out filter. In other words, by adding the drop-out filter to a conventional digital scanner, the normal dynamic range of a digital scanner is cut down substantially so that the digital scanner may not operate properly with a drop-out filter.

However, it is noted that some conventional scanners can adjust the lamp output, $H(\lambda)$ or the system gain K over a limited range during calibration so that $S_{normal}$ can be made equal to $S_{back}$ automatically. However, these adjustments will only work if the two values are not too different. If the values $H(\lambda)$ and K are too far apart, other changes will have to be made to the digital scanner, such as changing a lamp and/or power supply, etc. Thus, merely adding a conventional drop-out filter to a conventional digital scanner requires many adjustments so that the digital scanner can operate in the normal response range.

To solve this problem, the present invention utilizes a drop-out filter which not only passes the desirable range of visible wavelengths but also passes a range of infrared radiation so that the two ranges (spectrums) of light (wavelengths), when added together, provide enough radiation incident upon the sensor so that the sensor can operate normally. In other words, the present invention utilizes a color drop-out filter which passes the desired drop-out color in addition passes infrared radiation so that the digital scanner does not require any further adjustments in order for the digital scanner to operate properly. An example of this system is illustrated in FIG. 3.

Figure 3:
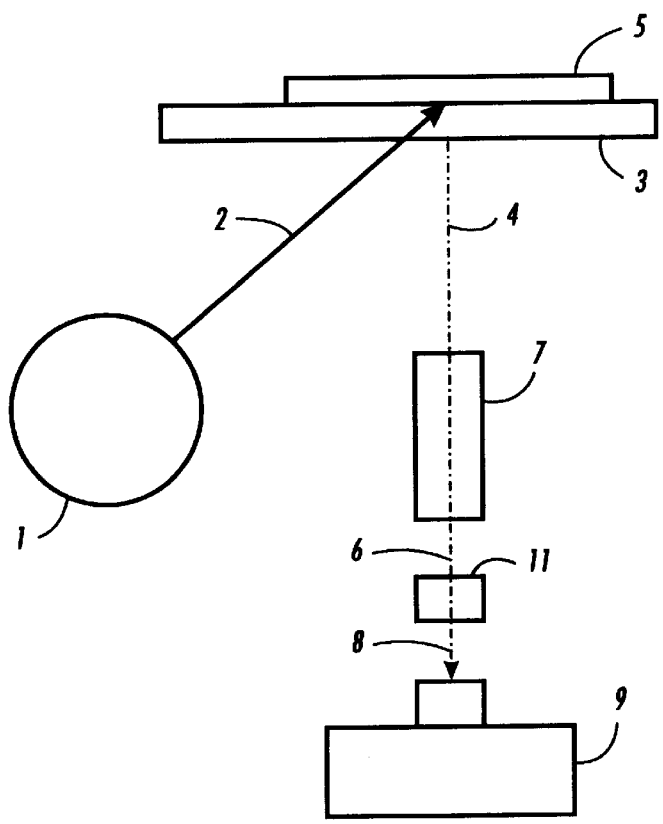
FIG. 3 illustrates a block diagram of a digital scanning system with color drop-out capabilities according to the concepts of the present invention.

As illustrated in FIG. 3, a digital scanning system includes an illumination system 1 which illuminates light (2) upon a document 5 having an original image to be scanned thereon. The document 5 is located in a image staging system 3 which may be glass platen if the digital scanner is a platen scanner or a constant velocity transport system if the digital scanner utilizes such a system to stage the document for scanning. Light (4) reflected from the document 5 is received by an optical lens system 7 which directs the light (6) towards a photoelectric system 9. The directed light (6) passes through a color drop-out filter 11 which passes the desired range of visible wavelengths and a range of infrared radiation such that both ranges of radiation (8) allow the digital scanner to operate with a color drop out response.

To further illustrate the concepts of the present invention, a red color drop-out filter will be discussed below.

As illustrated in FIG. 2, in a conventional digital scanner which has included a conventional red drop-out filter, the area under the curve (Line B) of the system output response (modified by the red bandpass filter from 580 to 650 nm) is so much less than the area under the curve for the conventional digital scanner without the red drop-out filter included in the image path. In other words, for a modified digital scanner to operate normally with a color drop-out filter, the area under the response curve multiplied by the spectral reflectivity of the drop out color must be substantially equal to the area under the response curve for a normal operation (Line B).

In FIG. 2, Line A represents the system response of a conventional digital scanner without any filtering. In order to make the system response of this scanner substantially photopic, one can add an optical filter such that the modified system spectral response is that shown as Line B. Since the white background of a document has a reflectivity that is substantially flat over the visible region 400 to 700 nm or so, the response of the scanner to the white background is substantially equal to the area under the curve of Line B.

In a conventional method of achieving red drop out, one could add another filter to the system that made the response function of Line B substantially zero for wavelengths less than 580 nm or so. The resulting area under the curve is much less than the original area under the curve, so other gain adjusting means will have to be provided (such as a brighter lamp, etc.)

Figure 4:
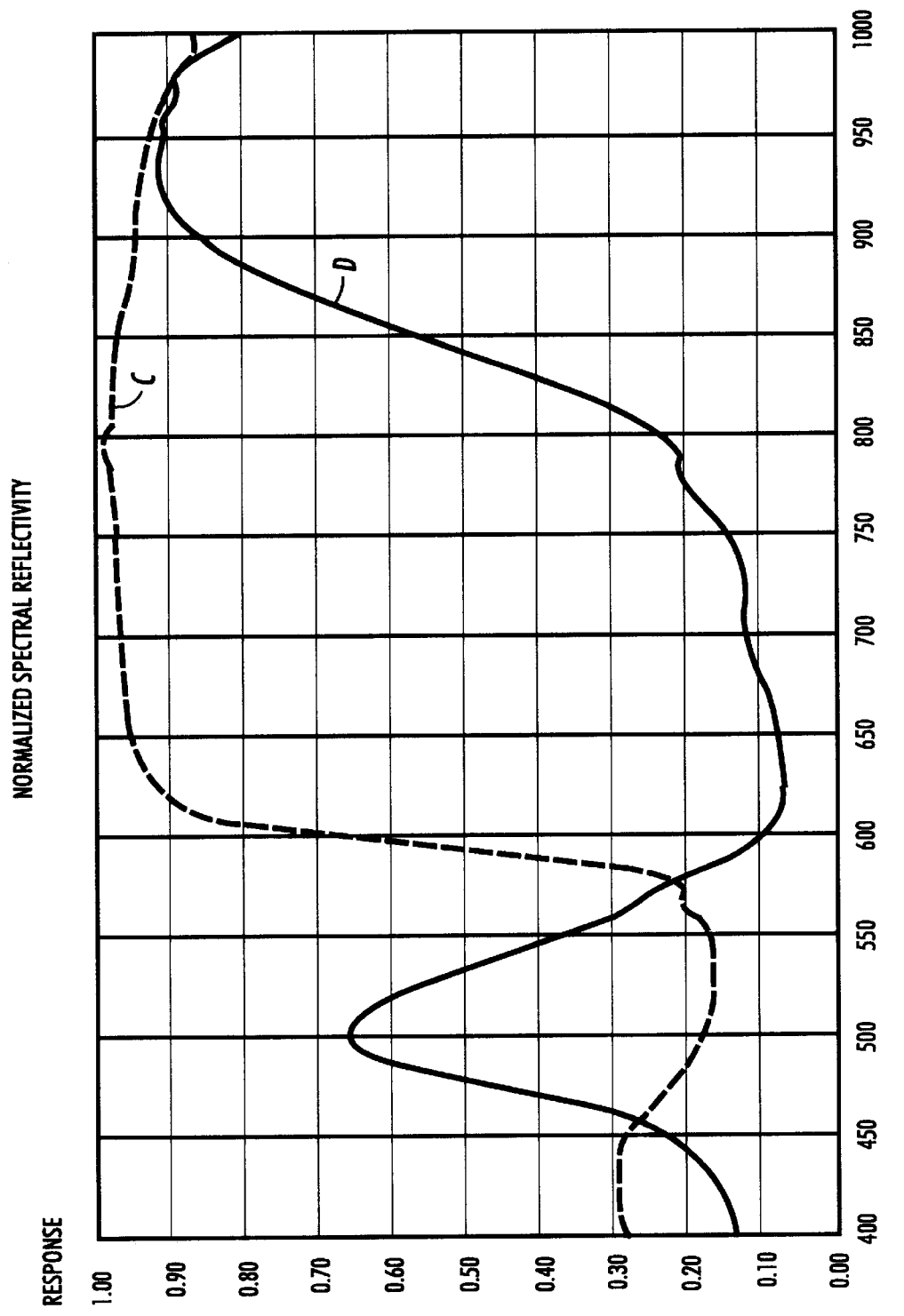
FIG. 4 is a graphical representation of the normalized spectral reflectivity of two different document colors according to the concepts of the present invention.

A preferred embodiment of the present invention utilizes a filter which consists of an additive red separation filter and a neutral density filter. Line C of FIG. 4 illustrates the spectral reflectivity of a typical red ink whose response we want to be substantially equal to that of the white background of a document. The spectral transmittance of the red separation filter closely matches Line C, so it could be expected that the response of the scanner to white document background will be substantially the same as for an original image to be scanned on the document that is of the color given by Line C.

However, since the additive red separation filter transmits light which has wavelengths that reside out past the 1000 nm point which can cause too much light to be incident upon the CCD sensor, a neutral density filter is combined with the additive red separation filter. In the preferred embodiment of the present invention, the neutral density filter has a nominal value of about 63% transmission. In other words, the red drop-out color filter of the preferred embodiment of the present invention is a filter consisting of two separate filters wherein one filter is an additive red separation filter and the other filter is a neutral density filter. The neutral density filter cuts down the overall amount of light back to a value such that the scanner calibrates at substantially the same lamp voltage as it would have calibrated under normal conditions.

In general, this procedure could be used to generate drop out filters for other colors. If there is sufficient effective reflectance of the ink (i.e., the reflectance of the ink/substrate combination) in infrared wavelengths where the response function of the unfiltered scanner (Line A) is nonzero, then a similar procedure could be used. For example, a typical green ink/substrate combination reflectance curve is shown in Line D. There is some infrared radiation reflectance that could be used with an appropriately designed filter to get green drop out performance without substantially changing the scanner calibration point.

Although the present invention has been described in detail above, various modifications can be made without departing from the spirit of the invention. For example, the above description describes the present invention as having the color drop-out filter located between the optical lens system and the photosensing system. However, this color drop-out filter can be placed anywhere along the image path between the original image to be scanned and the photoelectric system. In addition, the above description describes the present invention as having the color drop out filter composed of both an additive red separation filter and a neutral density filter. However, this color drop out filter could be designed with more or less than two separate filters.

In summary, the present invention provides a color drop-out filter for a digital scanner which can be easily inserted into the image path of the digital scanner without requiring further adjustments or modifications to the digital scanner. In other words, the drop-out filter provides a system output response curve wherein the area thereunder is substantially equal to the area under a system output response curve for the digital scanner operating under normal conditions.

While the present invention has been described with reference to various embodiments described above, it is not confined to the detail set forth above, but is intended to cover such modifications or changes as may come within the scope of the attached claims.

What is claimed is:

1. A digital scanning system, comprising:

an illumination system;

a document staging system;

an optical lens system;

a photosensing system to convert light to electrical signals; and a color drop-out filter;

said illumination system illuminating an original image to be scanned positioned in said document staging system;

said optical lens system directing light reflected from the original image to be scanned onto said photosensing system;

said color drop-out filter being located in an optical path between the original image to be scanned and said photosensing system;

said color drop-out filter allowing a predetermined range of wavelengths associated with a visible spectrum of light to pass therethrough and a range of wavelengths associated with infrared radiation to pass therethrough.

2. The digital scanner as claimed in claim 1, wherein said color drop-out filter comprises an additive color separation filter associated with the predetermined color and a neutral density filter.

3. The digital scanner as claimed in claim 1, wherein said color drop-out filter comprises an additive red separation filter and a neutral density filter.

4. The digital scanner as claimed in claim 1, wherein said photosensing system is a CCD sensor.

5. The digital scanner as claimed in claim 2, wherein said photosensing system is a CCD sensor.

6. The digital scanner as claimed in claim 3, wherein said photosensing system is a CCD sensor.

7. The digital scanner as claimed in claim 1, wherein said photosensing system is a full width array CCD sensor.

8. The digital scanner as claimed in claim 2, wherein said photosensing system is a full width array CCD sensor.

9. The digital scanner as claimed in claim 3, wherein said photosensing system is a full width array CCD sensor.

10. A color drop-out filter for a digital scanner, comprising:

an additive color separation filter; and a neutral density filter;

said additive color separation filter and said neutral density filter passing a predetermined range of wavelengths associated with a visible spectrum of light and a range of wavelengths associated with infrared radiation therethrough.

11. The color drop-out filter as claimed in claim 10, wherein said additive color separation filter is an additive red separation filter.

12. The color drop-out filter as claimed in claim 10, wherein said neutral density filter is about 63% transmissive.

13. The color drop-out filter as claimed in claim 11, wherein said neutral density filter is about 63% transmissive.

14. A color drop-out filter for a digital scanner, comprising:

an additive color separation filter; and a neutral density filter;

said additive color separation filter and said neutral density filter providing a drop-out filter that produces a system output response curve wherein an area thereunder is substantially equal to an area under a system output response curve for the digital scanner operating under normal conditions.

* * * * *